(12) United States Patent
Washino

(10) Patent No.: US 11,781,009 B2
(45) Date of Patent: Oct. 10, 2023

(54) RESIN COMPOSITION CAPABLE OF RELAXING ANISOTROPY BY FUSING AND RESIN MOLDED ARTICLE COMPRISING THE SAME

(71) Applicant: ENEOS Corporation, Tokyo (JP)

(72) Inventor: Gosuke Washino, Tokyo (JP)

(73) Assignee: ENEOS Corporation, Tokyo (JP)

( * ) Notice: Subject to any disclaimer, the term of this patent is extended or adjusted under 35 U.S.C. 154(b) by 228 days.

(21) Appl. No.: 17/286,760

(22) PCT Filed: Oct. 29, 2019

(86) PCT No.: PCT/JP2019/042399
§ 371 (c)(1),
(2) Date: Apr. 19, 2021

(87) PCT Pub. No.: WO2020/090823
PCT Pub. Date: May 7, 2020

(65) Prior Publication Data
US 2021/0371646 A1    Dec. 2, 2021

(30) Foreign Application Priority Data

Oct. 31, 2018  (JP) .................................. 2018-205700

(51) Int. Cl.
*C08L 67/03*    (2006.01)
*C08G 63/60*    (2006.01)
*C08G 63/80*    (2006.01)

(52) U.S. Cl.
CPC ............ *C08L 67/03* (2013.01); *C08G 63/605* (2013.01); *C08G 63/80* (2013.01); *C08L 2203/20* (2013.01)

(58) Field of Classification Search
CPC ...... C08G 63/605; C08G 63/60; C08G 63/80; C08L 2203/20; C08L 101/00; C08L 67/00; C08L 67/03; C08L 69/00
See application file for complete search history.

(56) References Cited

U.S. PATENT DOCUMENTS 5,633,319 A    5/1997  Silvi et al.

FOREIGN PATENT DOCUMENTS

| CN | 105860445 A | 8/2016 |
| JP | S63-006046 A | 1/1988 |

(Continued)

OTHER PUBLICATIONS

Japanese Patent Office, International Preliminary Report on Patentability in International Patent Application No. PCT/JP2019/042399 (dated Apr. 27, 2021).

(Continued)

*Primary Examiner* — Robert S Jones, Jr.
*Assistant Examiner* — Jiangtian Xu
(74) *Attorney, Agent, or Firm* — Leydig, Voit & Mayer, Ltd.

(57) ABSTRACT

The invention provides a resin composition that is capable of relaxing anisotropy while keeping the crystalline structure derived from liquid crystallinity and that has isotropic structure and physicality from a macroscopic view, even after the melt-processed molded article obtained by applying shear has been molded, cooled and fused without applying shear stress and subsequently re-cooled. The resin composition comprises a liquid crystal polyester resin (A) comprising structural unit (I) derived from a hydroxycarboxylic acid, structural unit (II) derived from a diol compound, and structural unit (III) derived from a dicarboxylic acid, and a resin (B) other than the liquid crystal polyester resin (A), and (Continued)

Diffraction pattern (before fusion) in Example 1-1 has an X-ray diffraction measured after fusing the resin composition that satisfies a specific condition.

18 Claims, 2 Drawing Sheets

(56) References Cited

FOREIGN PATENT DOCUMENTS

| JP | S64-001757 A | 1/1989 | | |
|---|---|---|---|---|
| JP | S64-070780 A | 3/1989 | | |
| JP | H06-049338 A | 2/1994 | | |
| JP | H09-176340 A | 7/1997 | | |
| JP | H09-291212 A | 11/1997 | | |
| JP | 2000-053849 A | 2/2000 | | |
| JP | 2000-160039 A | 6/2000 | | |
| JP | 2000-290512 A | 10/2000 | | |
| JP | 2000290512 A | * 10/2000 | ............... | C08J 5/18 |

OTHER PUBLICATIONS

Japan Patent Office, Notice of Reasons for Refusal in Japanese Patent Application No. 2018-205700 (dated Mar. 29, 2022).

China National Intellectual Property Administration, Office Action in Chinese Patent Application No. 201980072596.7 (dated Aug. 3, 2022).

Japan Patent Office, Notice of Reasons for Refusal in Japanese Patent Application No. 2018-205700 (dated Aug. 30, 2022).

Korean Intellectual Property Office, Office Action in Korean Patent Application No. 10-2021-7013077 (dated Sep. 14, 2022).

Koike et al., "Unusual Nematic Liquid Crystal with Polar $C_s$ Symmetry Formed from Aromatic Polyesters with Head-Tail Character," *Macromolecules*, 40(7): 2524-2531 (2007).

Taguchi et al., "Difference in Steady Shear Flow Viscosity between Polar and Nonpolar Nematic Liquid Crystals in Aromatic Polyesters Derived from VECTRA," *Macromolecules*, 42(8): 3179-3185 (2009).

Taguchi et al., "Unusual Transformation of the Mechanically Induced Monodomain State to the Polydomain One in Polar Nematic Liquid Crystals of Aromatic Polyesters," *J. Phys. Chem. B*, 113(16): 5341-5344 (2009).

Japanese Patent Office, International Search Report in International Patent Application No. PCT/JP2019/042399 (dated Jan. 28, 2020).

China National Intellectual Property Administration, Office Action in Chinese Patent Application No. 201980072596.7 (dated Jan. 28, 2023).

* cited by examiner

RESIN COMPOSITION CAPABLE OF RELAXING ANISOTROPY BY FUSING AND RESIN MOLDED ARTICLE COMPRISING THE SAME

CROSS-REFERENCE TO RELATED APPLICATIONS

This patent application is the U.S. national phase of International Patent Application No. PCT/JP2019/042399, filed Oct. 29, 2019, which claims the benefit of Japanese Patent Application No. 2018-205700, filed Oct. 31, 2018, which are incorporated by reference in their entireties herein.

BACKGROUND OF THE INVENTION

Field of the Invention

The present invention relates to a resin composition that is capable of relaxing anisotropy by fusing. The present invention also relates to a resin molded article comprising the resin composition and an electric and electronic component comprising the resin molded article.

Background Art

It is known that when a liquid crystal polymer is subjected to molding process in which shear is applied such as extrusion processing, the molecules show a significant uniaxial orientation. This uniaxial orientation induces "anisotropy" that generates significant structural/physical difference at a direction other than the specific uniaxial direction, in particular an axial direction deviating by 90 degrees. Material physicality seen macroscopically also generates various anisotropic properties and shows excellent physicality of, for example, a high elasticity in the molecular orientation direction. On the other hand, strength in the direction vertical to the molecular orientation direction is low, and the polymer in a film form is easily torn in the molecular orientation direction. Coefficient of thermal expansion (CTE) shows more significant anisotropy depending on the molecular orientation direction. Therefore, the liquid crystal polymer in a process to which heat is applied generates anisotropic expansion and contraction, and thus the anisotropy of CTE makes the material to easily warp or peel off from the joint dissimilar material, which is being a problem in the manufacturing/processing steps of a product.

Generally, when once most of the liquid crystal polymers are molded into molded articles by molding process to have uniaxial orientation, they keep the uniaxial orientation even if heat history by shear stress at the time of processing was removed by heating to a temperature equal to or higher than the melting point, and thus there is a problem that structural anisotropy once generated by processing continues to remain in the product. On the other hand, there have been reported exceptional liquid crystal polymers in this property. According to Non-Patent Documents 1-3, a liquid crystal polymer comprising only hydroxyl carboxylic acid and having polarity as a molecule (in the Examples of the documents, the liquid crystal polymer comprises 73 mol % of p-hydroxybenzoic acid and 27 mol % of 6-hydroxyl-2-naphthoic acid) was processed into a strand in a melted state and then by applying shear, was prepared into a molded article having a significant uniaxial orientation. Thereafter, the molded article was heated under no load and no shear to a temperature equal to or higher than the melting point so that crystallinity or anisotropy that can be evaluated by a polarization microscope is relaxed, and it is reported that anisotropy of the material can overcome, or the level of anisotropy can be relaxed and be changed to an isotropic state, i.e. "anisotropy can be relaxed". However, it is also reported in the same report that the liquid crystal polymer obtained by copolymerization of diol and dicarboxylic monomer lost this ability to relax anisotropy. Since the liquid crystal polymer comprising only a hydroxyl carboxylic acid has limited kinds or numbers of the monomers that can be used as compared with the liquid crystal polymer comprising diol and dicarboxylic acid, it has less flexibility in molecular design. With respect to the physicality aspect, the liquid crystal polymer having diol and dicarboxylic acid monomer is known to be superior to the liquid crystal polymer comprising only the hydroxyl dicarboxylic acid in terms of heat resistance and dielectric property.

PRIOR ART DOCUMENT

Non-Patent Document

Non-Patent Document 1: Macromolecules, 40(7), 2007, 2524-2531
Non-Patent Document 2: Macromolecules, 42(8), 2009
Non-Patent Document 3: J. Phys. Chem. B, 113(16), 2009, 5341-5344

SUMMARY OF THE INVENTION

Problem to be Solved by the Invention

Due to the reason above, liquid crystal polymers have no choice but to be used in an anisotropic state in actual use, apart from specific liquid crystal polymers obtained by polymerization of only aromatic hydroxycarboxylic acids, and there was a technical problem that their use purpose has often been limited as compared with the other crystalline polymers despite of the various excellent properties the liquid crystal polymers have. Since the liquid crystal polymers obtained by solid-phase polymerization, which is a method for polymerization of liquid polymers having even higher heat resistance performance, have more heat history at the time of polymerization, they have the tendency to maintain the anisotropy more significantly.

Therefore, the object of the present invention is to provide a resin composition that is capable of relaxing anisotropy while keeping the crystalline structure derived from liquid crystallinity and that has isotropic structure and physicality from a macroscopic view, even after the melt-processed molded article obtained by applying shear has been molded, cooled and fused without applying shear stress and subsequently re-cooled. The object of the present invention is also to provide a resin molded article having excellent processability, comprising such resin composition.

Means to Solve the Problem

In order to solve the above-described problem, the present inventors have intensively studied to find that a resin composition being a mixture of a liquid crystal polyester resin (A) and a resin (B) other than the liquid crystal polyester resin (A) can have reduced anisotropy due to the molecule orientation and isotropic structure and physicality from a macroscopic view when X-ray diffraction obtained by measuring a melt-processed molded article which is molded by shear stress, fused without applying shear stress, and subsequently re-cooled, satisfies a specific condition. The present invention has been completed based on this finding.

That is, according to one embodiment of the present invention, there is provided a resin composition comprising a liquid crystal polyester resin (A) comprising structural unit (I) derived from a hydroxycarboxylic acid, structural unit (II) derived from a diol compound, and structural unit (III) derived from a dicarboxylic acid, and a resin (B) other than the liquid crystal polyester resin (A), and satisfying the following condition:

(Condition)

a plate-form molded article obtained by flowing in the resin composition from one gate and subjecting to melt molding process is fused under no load without applying shear at a temperature equal to or 20° C. higher than $Tm_2$ measured by DSC and subsequently re-cooled has an X-ray diffraction intensity measured by transmitted X-ray satisfying mathematical formula (1):

$$0.30 \leq I(TD)/\{I(MD)+I(TD)\} \leq 0.70 \qquad (1)$$

wherein

MD represents the flowing-in direction of the resin composition at the time of melt molding process and TD represents the vertical direction of MD;

I is the value of maximum diffraction intensity of X-ray diffraction data at the time of measuring the plate-form molded article with transmitted X-ray at 2θ=19-20°;

I (MD) is the value of X-ray diffraction intensity caused by molecular orientation of the MD direction; and I (TD) is the value of X-ray diffraction intensity of the TD direction.

According to one embodiment of the present invention, preferably, the amount of the liquid crystal polyester resin (A) blended is 85 part by mass or more and 99.99 part by mass or less and the amount of the resin (B) blended is 0.01 part by mass or more and 15 part by mass or less, based on the total of 100 part by mass of the liquid crystal polyester resin (A) and the resin (B).

According to one embodiment of the present invention, preferably, the structural unit (I) derived from a hydroxylcarboxylic acid is a structural unit derived from 6-hydroxy-2-naphthoic acid and/or p-hydroxybenzoic acid.

According to one embodiment of the present invention, the structural unit (II) derived from a diol compound is preferably a structural unit derived from at least one selected from the group consisting of 4,4'-dihidroxybiphenyl, hydroquinone, methyl hydroquinone, and 4,4'-isopropiridene diphenol.

According to one embodiment of the present invention, the structural unit (III) derived from a dicarboxylic acid is preferably a structural unit derived from at least one selected from the group consisting of terephthalic acid, isophthalic acid, and 2,6-naphthalene dicarboxylic acid.

According to one embodiment of the present invention, the resin (B) preferably has at least one selected from the group consisting of an ester group, a carbonate group, and an ether group.

According to one embodiment of the present invention, the resin (B) is preferably at least one selected from the group consisting of a noncrystalline polyarylate, polyester, and polycarbonate.

According to one embodiment of the present invention, the liquid crystal polyester resin (A) is preferably synthesized from solid-phase polymerization.

According to another embodiment of the present invention, there is provided a resin molded article comprising the resin composition.

According to another further embodiment of the present invention, there is provided an electric and electronic component comprising the resin molded article.

Effect of the Invention

According to the present invention, it is possible to achieve a resin composition having an isotropic structure and physicality from a macroscopic view, that is capable of relaxing anisotropy while keeping the crystalline structure derived from liquid crystallinity even after the melt-processed molded article obtained by applying shear has been molded, cooled and fused without applying shear stress and subsequently re-cooled. The use of such resin composition makes it possible to improve the processability of the resin molded article.

DETAILED DESCRIPTION OF THE INVENTION

Mode for Carrying Out the Invention

[Resin Composition]

Figure 1:
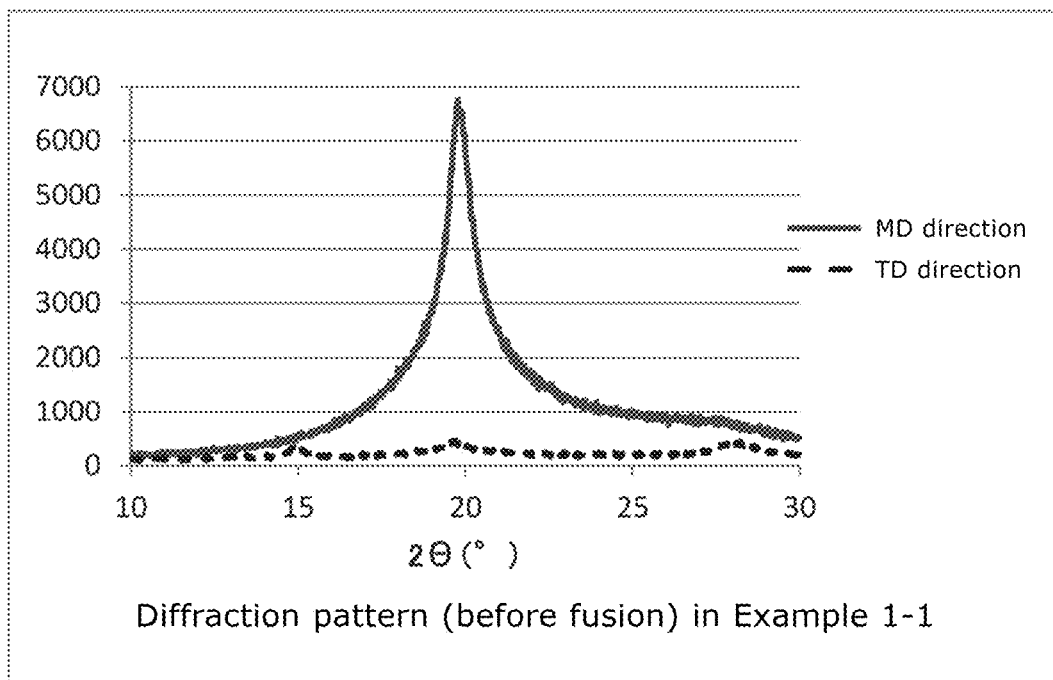
FIG. 1 shows an X-ray diffraction pattern of an injection molded article (before fusion) using a resin composition of Example 1-1.

A resin composition according to the present invention comprises a liquid crystal polyester resin (A) and a resin (B) other than the liquid crystal polyester resin (A) as below. In a resin molded article comprising such resin composition, the orientation of the liquid crystal polyester resin (A) is in a level of one molecule of nematic liquid crystal or in a region unit having a homogeneous nematic liquid crystal orientation within a certain range to which the nematic liquid crystal molecules are assembled (hereinunder referred to as "domain"), before fusion. In the present invention, even the melt-processed molded article obtained by applying shear is in a state of being molded, cooled and fused without applying shear stress and subsequently re-cooled can have the liquid crystal polyester resin (A) with significantly relaxed anisotropy and being isotropic as compared before fusion under no shear from a macroscopic view (in domain units) and becomes stable in such state, while keeping the crystalline structure derived from crystallinity that can be evaluated by X-ray diffraction. That is to say, in the present invention, blending the resin (B) other than the liquid crystal polyester resin (A) in a small amount into the main component (preferably, 85% by mass or more of the entire resin), i.e. the liquid crystal polyester resin (A), makes it possible to improve the molecular mobility of such as the noncrystalline portion so that the anisotropy of orientation in domain units is relaxed and as a result, the biaxial isotropic state is stabilized, while maintaining the nematic crystallinity of the material. The use of such resin composition makes it possible to improve the processability at the time of manufacturing the resin molded article.

Such resin composition is characterized in that it satisfies the following condition.

(Condition)

A plate-form molded article obtained by allowing the resin composition to flow in from one gate and subjecting to melt molding process is fused without applying shear at a temperature equal to or 20° C. higher than $Tm_2$ measured by DSC and subsequently re-cooled has a diffraction intensity measured by transmitted X-ray satisfying mathematical formula (1):

$$0.30 \leq I(TD)/\{I(MD)+I(TD)\} \leq 0.70 \quad (1)$$

wherein

MD represents the flowing-in direction of the resin composition at the time of melt molding process and TD represents the vertical direction of MD;

I is the value of maximum diffraction intensity of X-ray diffraction data at the time of measuring the plate-form molded article with transmitted X-ray at $2\theta=19\text{-}20°$;

I (MD) is the value of diffraction Intensity caused by molecular orientation of the MD direction; and I (TD) is the value of diffraction intensity of the TD direction.

Note that, $2\theta=19\text{-}20°$ Is a crystal diffraction derived from the molecular distribution of the liquid crystal polyester resin.

In the present invention, preferably, mathematical formula (2) is satisfied and more preferably, mathematical formula (3) is satisfied with the above condition.

$$0.35 \leq I(TD)/\{I(MD)+I(TD)\} \leq 0.68 \quad (2)$$

$$0.40 \leq I(TD)/\{I(MD)+I(TD)\} \leq 0.65 \quad (3).$$

In the present specification, the melting point of the resin composition is in accordance with the test method of ISO11357 ASTM D3418 and can be measured using a differential scanning calorimeter (DSC) manufactured by Hitachi High-Tech Science K.K., and is determined as the temperature (° C.) of the endotherm peak ($Tm_2$) accompanied by the transition from the crystalline phase to the liquid phase of the second cycle in the temperature escalation process measured with DSC.

The physical anisotropy and isotropy of the resin molded article comprising the resin composition can be evaluated by measuring the coefficient of thermal expansion (CTE) of the sample of the resin molded article in tensile mode using a thermomechanical analyzer (manufactured by Hitachi High-Tech Science K.K.; type number: TMA 7000). The CTE difference (absolute value) between the TD and MD directions being large means the state of having a significant anisotropy and the CTE difference (absolute value) between the TD and MD directions being small means the state of being isotropic. Further, when the processing of the sample was able to advantageously reduce the large CTE difference between the TD and MD directions as of the initial state, it means that the anisotropy was relaxed, and the isotropy was obtained in physicality.

In the present invention, anisotropy is deemed to be relaxed and isotropy is obtained in physicality when the CTE difference (absolute value) was reduced by 50% or less, preferably by 30% or less than before fusion when CTE of the TD and MD directions were measured with the melt processed molded article by applying shear being in a state in which it is molded and cooled, subsequently fused without applying shear, and re-cooled. Reducing the anisotropy of the resin molded article makes it possible to improve the processability.

Each component comprised in the resin composition shall be explained below.

(Liquid Crystal Polyester Resin (A))

The liquid crystal polyester resin used for the resin composition of the present invention comprises structural unit (I) derived from a hydroxycarboxylic acid, structural unit (II) derived from a diol compound, and structural unit (III) derived from a dicarboxylic acid. Each constituting unit comprised in the liquid crystal polyester resin shall be explained below.

(Structural Unit (I) Derived from Hydroxycarboxylic Acid)

Unit (I) constituting the liquid crystal polyester resin (A) is a structural unit derived from a hydroxycarboxylic acid, and preferably is a structural unit derived from an aromatic hydroxycarboxylic acid represented by the following formula (I). Note that, only one of structural unit (I) may be comprised, or even 2 or more may be possible.

(I)

$Ar^1$ is selected from the group consisting of a phenyl groups biphenyl group, 4,4'-isopropilidene diphenyl group, naphthyl group, anthryl group, and phenanthryl group optionally having a substituent. Amongst these, a phenyl group and a biphenyl group are more preferred. Examples of the substituent include a hydrogen atom, alkyl group, alkoxy group, and fluorine. The number of carbons the alkyl group has is preferably 1 to 10 and more preferably 1 to 5. The alkyl group may be of a straight chained or of a branched chained. The number of carbons the alkoxy group has is preferably 1 to 10 and more preferably 1 to 5.

Examples of the monomer that gives the structural unit represented by Formula (I) as above includes 6-hydroxy-2-naphthoic acid (HNA, Formula (1) below) and/or p-hydroxybenzoic acid (HBA, Formula (2) below), and acylated products, ester derivatives, acid halides thereof.

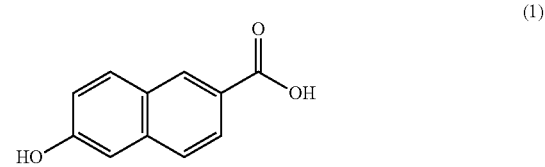

(1)

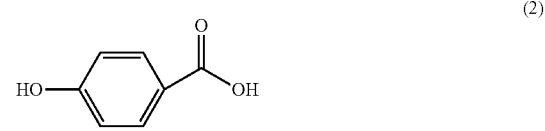

(2)

The composition ratio (mol %) of the structural unit (I) based on the structural units of the entire polyester resin has a lower limit of preferably 30 mol % or more, more preferably 35 mol % or more, further preferably 40 mol % or more, further more preferably 45 mol % or more, and an upper limit of preferably 80 mol % or less, more preferably 75 mol % or less, further preferably 70 mol % or less, further more preferably 65 mol % or less. When two or more structural units (I) are contained, the total molar ratio thereof may be within the range of the above composition ratio.

(Structural Unit (II) Derived from Diol Compound)

The unit (II) constituting the liquid crystal polyester resin (A) is a structural unit derived from a diol compound, and is preferably a structural unit derived from an aromatic diol compound represented by formula (II). Only one of structural unit (II) may be comprised, or even 2 or more may be possible.

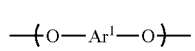
(II)

In the above formula, $Ar^2$ is selected from the group consisting of a phenyl group, biphenyl group, 4,4'-isopropylidene diphenyl group, naphthyl group, anthryl group, and phenanthryl group, optionally having a substituent. More preferred among these are a phenyl group and a biphenyl group. Examples of the substituent include hydrogen, an alkyl group, alkoxy group, and fluorine. The alkyl group preferably has 1 to 10 carbons and more preferably 1 to 5 carbons. The alkyl group may be linear alkyl groups or branched alkyl groups. The number of carbons contained in the alkoxy group is preferably 1 to 10 and more preferably 1 to 5.

Examples of the monomer which provides the structural unit (II) include 4,4'-dihydroxybiphenyl (BP, Formula (3) below), hydroquinone (HQ, Formula (4) below), methyl hydroquinone (MeHQ, Formula (5) below), 4,4'-isopropylidenediphenol (BisPA, Formula (6) below), and acyl derivatives, ester derivatives, and acid halides thereof and the like.

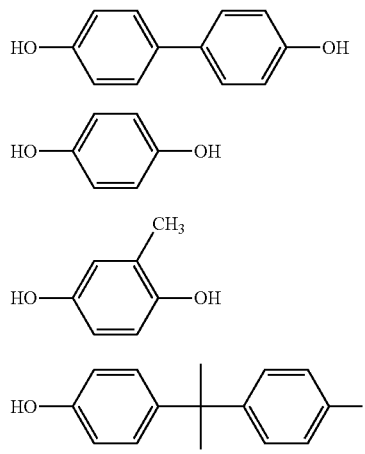
(3)
(4)
(5)
(6)

The composition ratio (mol %) of the structural unit (II) based on the structural units of the entire polyester resin has a lower limit of preferably 10 mol % or more, more preferably 12.5 mol % or more, further preferably 15 mol % or more, further more preferably 17.5 mol % or more, and an upper limit of preferably 35 mol % or less, more preferably 32.5 mol % or less, further preferably 30 mol % or less, further more preferably 27.5 mol % or less. When two or more structural units (II) are contained, the total molar ratio thereof may be within the ranges of the above composition ratio.

(Structural Unit (III) Derived from Aromatic Dicarboxylic Acid)

The unit (III) constituting the liquid crystal polyester resin (A) is a structural unit derived from a dicarboxylic acid, and preferably a structural unit derived from an aromatic dicarboxylic acid represented by the following Formula (III). Only one of structural unit (III) may be comprised, or even 2 or more may be possible.

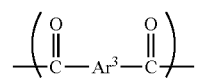
(III)

In the above formula, $Ar^3$ is selected from the group consisting of a phenyl group, biphenyl group, 4,4'-isopropylidene diphenyl group, naphthyl group, anthryl group, and phenanthryl group, optionally having a substituent. More preferred among these are a phenyl group and a biphenyl group. Examples of the substituent include hydrogen, an alkyl group, an alkoxy group, fluorine, and the like. The alkyl group preferably has 1 to 10 carbons and more preferably 1 to 5 carbons. The alkyl group may be linear alkyl groups or branched alkyl groups. The number of carbons contained in the alkoxy group is preferably 1 to 10 and more preferably 1 to 5.

Examples of the monomer which provides the structural unit (III) include terephthalic acid (TPA, Formula (7) below), isophthalic acid (IPA, Formula (8) below), 2,6-naphthalenedicarboxylic acid (NADA, Formula (9) below), and acyl derivatives, ester derivatives, acid halides thereof, and the like.

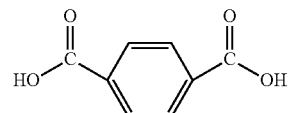
(7)

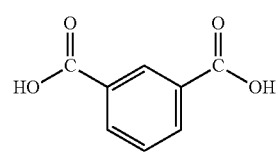
(8)

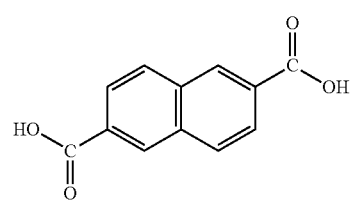
(9)

The composition ratio (mol %) of the structural unit (III) based on the total structural units of the entire polyester resin (A) has a lower limit of preferably 10 mol % or more, more preferably 12.5 mol % or more, further preferably 15 mol % or more, further more preferably 17.5 mol % or more, and an upper limit of preferably 35 mol % or less, more preferably 32.5 mol % or less, further preferably 30 mol % or less, further more preferably 27.5 mol % or less. When two or more structural units (II) are contained, the total molar ratio thereof may be within the ranges of the above composition ratio. The composition ratio of the structural unit (II) and the composition ratio of the structural unit (III) are substantially equivalent ((structural unit (II) T structural unit (III)).

The liquid crystal properties of the liquid crystal polyester resin (A) can be confirmed by heating and melting the liquid crystal polyester resin (A) on a microscope heating stage using a polarizing microscope (product name: BH-2) manufactured by Olympus Co., Ltd. having a hot stage (product name: FP82HT) manufactured by Mettler, and observing whether or not optical anisotropy can be seen.

The lower limit of the melting point of the liquid crystal polyester resin (A) is preferably 280° C. or higher, more preferably 290° C. or higher, further preferably 300° C. or higher, and further more preferably 305° C. or higher. The upper limit is preferably 370° C. or less, preferably 360° C. or less, further preferably 355° C. or less, and further more preferably 350° C. or less. By setting the melting point of the liquid crystal polyester resin (A) within the above numerical ranges, it is possible to improve the processing stability of the resin composition containing the liquid crystal polyester resin (A) within the range shown in the present invention, specifically, the stability of melt processing properties when being subjected to shear and melt processing stability when shear is not applied, and also it is possible to maintain the heat resistance as a material of a molded article produced by using the resin composition in a favorable range from the viewpoint of solder heat resistance.

In view of melt moldability, the melt viscosity of the liquid crystal polyester resin (A) has a lower limit of preferably 5 Pa·s or more, more preferably 10 Pa·s or more, further preferably 15 Pa·s or more, and an upper limit of preferably 200 Pa·s or less, more preferably 150 Pa·s, further preferably 100 Pa·s or less, under the conditions of the melting point of the liquid crystal polyester resin +20° C. or higher and the shear rate of 1000 $s^{-1}$.

(Method for Producing Liquid Crystal Polyester Resin (A))

The liquid crystal polyester resin (A) can be produced by polymerizing a monomer, which optionally provides structural units (I) to (III), by a known method. In one embodiment, the wholly aromatic liquid crystal polyester resin according to the present invention can also be produced by two-step polymerization in which a prepolymer prepared by melt polymerization is then further subjected to solid-phase polymerization.

From the viewpoint of efficiently obtaining the polyester compound according to the present invention, the melt polymerization is preferably carried out under acetic acid reflux in the presence of acetic anhydride in an amount of 1.05 to 1.15 molar equivalents with respect to all the hydroxyl groups contained in the monomer, with the monomer providing the above structural units (I) to (III) being a total of 100 mol % in a predetermined combination.

In the case where the polymerization reaction is carried out in two steps of the melt polymerization and the subsequent solid phase polymerization, the prepolymer obtained by the melt polymerization is cooled and solidified, pulverized into powder or flakes, and subsequently a known solid phase polymerization method is preferably employed, for example, a method in which the prepolymer resin is heat-treated in an inert atmosphere such as nitrogen or under vacuum at a temperature of 200 to 350° C. for 1 to 30 hours. The solid phase polymerization may be carried out while stirring, or may be carried out in a still standing state without stirring.

A catalyst can be used or need not be used in the polymerization reaction. The catalyst to be used may be conventionally known catalysts as catalysts for polymerization of polyesters, examples thereof being metal salt catalysts such as magnesium acetate, stannous acetate, tetrabutyl titanate, lead acetate, sodium acetate, potassium acetate, and antimony trioxide, nitrogen-containing heterocyclic compounds such as N-methylimidazole, organic compound catalysts, and the like. The amount of the catalyst used is not particularly limited, and is preferably 0.0001 to 0.1 parts by weight based on 100 part by weight of the total amount of the monomer.

The polymerization reaction apparatus in the melt polymerization is not particularly limited, and a reaction apparatus used for the reaction of a general high viscosity fluid is preferably used. Examples of these reaction apparatuses include, for example, an stirring tank type polymerization apparatus having an stirring blade of an anchor type, a multistage type, a spiral band type, a spiral shaft type or the like, or a variety of shapes obtained by modifying these types, mixing apparatuses generally used for kneading resins such as a kneader, a roll mill, and a Banbury mixer.

(Resin (B))

The resin (B) other than the liquid crystal polyester resin (A) is not particularly limited, and a non-liquid crystal resin can be used, examples thereof including noncrystalline polyarylate, polyester, polycarbonate, and polyphenylene ether. In particular, the resin (B) is preferably a resin having at least one selected from the group consisting of ester groups, carbonate groups, and ether groups. Only one of the resin (B) may be used, or two or more may also be possible.

The noncrystalline polyarylate is a noncrystalline aromatic polyester polymer comprising an aromatic dicarboxylic acid or a derivative thereof and a dihydric phenol or a derivative thereof. Examples of the raw materials for introducing aromatic dicarboxylic acid residues include terephthalic acid, isophthalic acid, phthalic acid, chlorophthalic acid, nitrophthalic acid, 2,5-naphthalenedicarboxylic acid, 2,6-naphthalenedicarboxylic acid, 2,7-naphthalenedicarboxylic acid, 1,5-naphthalenedicarboxylic acid, methylterephthalic acid, 4,4'-biphenyldicarboxylic acid, 2,2'-biphenyldicarboxylic acid, 4,4'-diphenylether dicarboxylic acid, 4,4'-diphenylmethane dicarboxylic acid, 4,4'-diphenylsulfone dicarboxylic acid, 4,4'-diphenylisopyridene dicarboxylic acid, 1,2-bis(4-carboxyphenoxy)ethane, 5-sodium sulfoisophthalic acid, and the like. The raw material for introducing bisphenol residues is bisphenol, and specific examples thereof include resorcinol, 2,2-bis(4-hydroxyphenyl)propane, 2,2-bis(4-hydroxy-3,5-dimethylphenyl)propane, 2,2-bis(4-hydroxy-3-methylphenyl)propane, 2,2-bis(4-hydroxy-3,5-dibromophenyl)propane, 2,2-bis(4-hydroxy-3,5-dichlorophenyl)propane, 4,4'-dihydroxydiphenyl sulfone, 4,4'-dihydroxydiphenyl ether, 4,4'-dihydroxydiphenyl sulfide, 4,4'-dihydroxydiphenyl ketone, 4,4'-dihydroxydiphenylmethane, 1,1-bis(4-hydroxyphenyl) cyclohexane, and 3,3,5-trimethyl-1,1-bis(4-hydroxyphenyl) cyclohexane.

The above-described polyester is a polymer of dicarboxylic acid and diol. Examples of the dicarboxylic acid which is a polyester raw material include terephthalic acid, isophthalic acid, and 2,6-naphthalenedicarboxylic acid. Examples of the diol which is a polyester raw material include ethylene glycol, 1,2-propanediol, 1,3-propanediol, 1,4-butanediol, 1,4-cyclohexanedimethanol, and 1,5-pentanediol.

The above-described polycarbonate is a polycarbonic acid ester formed by repeating a bisphenol residue unit and a carbonate residue unit. Examples of bisphenols which are polycarbonate raw materials for introducing the bisphenol residue unit include 2,2-bis(4-hydroxyphenyl)propane, 2,2-bis (3,5-dibromo-4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)decane, 1,3- or 1,2-bis(4-hydroxyphenyl)propane, 1,1-bis(4-hydroxyphenyl)cyclododecane, 4,4'-dihydroxydiphenyl ether, 4,4'-dithiodiphenol, 4,4'-dihydroxy-3,3'-dichlorodiphenyl ether, 4,4'-dihydroxy-2,5-dihydroxydiphenyl ether, and the like. Examples of polycarbonate raw materials for introducing the carbonate residue unit include phosgene, diphenyl carbonate, and the like.

The amount of the liquid crystal polyester resin (A) blended in the resin composition according to the present invention is, as the lowest limit, preferably 85 part by mass or more, more preferably 90 part by mass or more, further preferably 92 part by mass or more, further more preferably 93 part by mass or more, and as the upper limit is preferably 99.99 part by mass or less, more preferably 99.95 part by mass or less, further preferably 99.9 part by mass or less, further preferably 99 part by mass or less, based on 100 part by mass of the total of the liquid crystal polyester resins (A) and (B). The amount of the liquid crystal polyester resin (B) is, as the lower limit, preferably 0.01 part by mass or more, more preferably 0.05 part by mass or more, further preferably 0.1 part by mass or more, further more preferably 1 part by mass or more, and as the upper limit, preferably 15 part by mass or less, more preferably 10 part by mass or less, further preferably 8 part by mass or less, further more preferably 7 part by mass or less, based on 100 part by mass of the total of the liquid crystal polyester resins (A) and (B). When the blending ratio of the liquid crystal polyester resins (A) and (B) is in the above-described numerical ranges, the resin molded article comprising the resin composition obtained by melt processing under shear can have relaxed anisotropic properties and become isotropic while maintaining the crystal structure derived from liquid crystal properties in a state of being once melted and then cooled again. It is possible to improve processing properties by making the resin molded article isotropic.

The resin composition according to the present invention may include other additives such as a colorant, a dispersant, a plasticizer, an antioxidant, a curing agent, a flame retardant, a thermal stabilizer, an ultraviolet absorber, an antistatic agent, and a surfactant, as long as the effect of the present invention is not impaired.

(Resin Molded Article)

The resin molded article according to the present invention comprises the above-described resin composition, and is capable of relaxing anisotropic properties and having isotropic structure and physical properties from a macroscopic view while keeping a crystal structure derived from liquid crystal properties even in a state being re-cooled after being molded, cooled, and subsequently fused without shear.

The liquid crystal properties of the resin molded article according to the present invention can be confirmed in the same manner as the liquid crystal properties of the liquid crystal polyester resin (A).

(Method for Manufacturing Resin Molded Article)

In the present invention, a resin composition comprising the above-described liquid crystal polyester resin (A) and another resin (B), and optionally an additive can be obtained by molding by a conventionally known method. The resin composition can be obtained by melt-kneading the wholly liquid crystal polyester resins (A) and another resin (B) using a Banbury mixer, a kneader, a uniaxial or biaxial extruder, and the like.

Examples of the molding method include press molding, foam molding, injection molding, extrusion molding, and punch molding. The molded article produced as described above can be processed into various shapes depending on the application. The shape of the molded article may be, for example, a plate shape or a film shape.

(Electric and Electronic Component)

An electric and electronic component according to the present invention comprises the resin composition. Examples of the electric and electronic component include antennas used for electronic instruments and communication instruments such as ETC, GPS, wireless LAN, and mobile phones; connectors for high-speed transmission; CPU sockets; circuit boards; flexible printed circuit boards (FPCs); multilayer circuit boards; millimeter and quasi-millimeter wave radars such as collision prevention radars; RFID tags; condensors; inverter components; insulating films; cable covering materials; insulating materials for secondary batteries such as lithium ion batteries; speaker diaphragms; and the like.

EXAMPLES

Hereinafter, the present invention shall be described in more details with reference to the Examples; however, the present invention shall not be limited to the Examples.

<Production of Liquid Crystal Polyester Resin (A)>

Synthesis Example 1

To a polymerization vessel having a stirring blade, 60 mol % of p-hydroxybenzoic acid (HBA), 20 mol % of 4,4'-dihydroxybiphenyl (BP), 13 mol % of terephthalic acid (TPA), and 7 mol % of isophthalic acid (IPA) were added, then potassium acetate and magnesium acetate were charged as catalysts, and after nitrogen substitution by carrying out pressure reduction—nitrogen injection of the polymerization vessel for three times, acetic anhydride (1.08 mol equivalent based on hydroxyl group) was further added, the temperature was raised to 150° C., and the acetylation reaction was carried out for 2 hours under reflux.

After completion of acetylation, the temperature of the polymerization vessel in a state where the acetic acid is distilled out was raised at 0.5° C./min, and when the temperature of the melt in the vessel reached 310° C., the polymer was extracted and cooled and solidified. The obtained polymer was pulverized to a size passing through a sieve having a mesh opening of 2.0 mm, thereby giving a prepolymer.

Next, the prepolymer obtained above was heated from room temperature to 290° C. under a flow of nitrogen for 6 hours in an oven manufactured by Yamato Kagaku Co., Ltd., and then solid phase polymerization was carried out while maintaining the temperature at 290° C. for 1 hour. Thereafter, heat was naturally released at room temperature to obtain a liquid crystal polyester resin. By using a polarizing microscope (product name: BH-2) made by Olympus Co., Ltd. equipped with a hot stage for a microscope (product name: FP82HT) manufactured by Mettler, the liquid crystal polyester resin sample was heated and melted on the microscope heating stage, and it was confirmed that liquid crystal properties were exhibited from the presence or absence of optical anisotropy.

Synthesis Example 2

A liquid crystal polyester resin 2 was obtained in the same manner as in Synthesis Example 1 except that the monomer feed was changed to 60 mol % of 6-hydroxy-2-naphthoic acid (HNA), 20 mol % of BP, 15.5 mol % of TPA, and 4.5 mol % of 2,6-naphthalenedicarboxylic acid (NADA), and the final temperature of solid phase polymerization was changed to 300° C. and the holding time was changed to 2 hours. Subsequently, it was confirmed that the obtained liquid crystal polyester resin 2 exhibits liquid crystal properties in the same manner as described above.

Synthesis Example 3

A liquid crystal polyester resin 3 was obtained in the same manner as in Synthesis Example 2 except that the final temperature of the solid phase polymerization was changed to 310° C. and the holding time was changed to 2 hours. Subsequently, it was confirmed that the obtained liquid crystal polyester resin 3 exhibits liquid crystal properties in the same manner as described above.

Synthesis Example 4

A liquid crystal polyester resin 4 was obtained in the same manner as in Synthesis Example 1 except that the monomer feed was changed to 50 mol % of HNA, 25 mol % of BP, 17 mol % of TPA, and 8 mol % of NADA, and the final temperature of solid phase polymerization was changed to 300° C. and the holding time was changed to 1 hour. Subsequently, it was confirmed that the obtained liquid crystal polyester resin 4 exhibits liquid crystal properties in the same manner as described above.

The structural units (monomer composition) of the liquid crystal polyester resins 1 to 4 obtained above are shown in Table 1.

(Measurement of Melting Point)

The melting points of the liquid crystal polyester resins 1 to 4 obtained above were measured by a differential scanning calorimeter (DSC) manufactured by Hitachi High-Tech Science Co., Ltd. according to the test methods of ISO11357 and ASTM D3418. At this time, the endothermic peak obtained by raising the temperature from room temperature to 360-380° C. at a temperature elevation rate of 10° C./min to completely fuse the polymer, and then lowering the temperature to 30° C. at a rate of 10° C./min, and then further raising the temperature to 380° C. at a rate of 10° C./min was determined as the melting point ($Tm_2$). The measurement results are shown in Table 1.

(Melt Viscosity Measurement)

With respect to the liquid crystal polyester resins 1 to 4 obtained above, the melt viscosity (Pa·s) at the melting point +20° C. at a shear rate of 1000 $S^{-1}$ was measured using a capillary rheometer viscometer (Capillograph 1D, Toyo Seiki Seisakusyo Co., Ltd.) and a capillary having an inner diameter of 1 mm, in accordance with JIS K7199. The measurement results are shown in Table 1.

TABLE 1

| Liquid Crystal Polyester Resin (A) | Composition Ratio (mol %) | | | | | | Melting Point (° C.) | Melt Viscosity (Pa · s) |
|---|---|---|---|---|---|---|---|---|
| | Structural unit (I) | | Structural unit (II) | Structural unit (III) | | | | |
| | HBA | HNA | BP | TPA | NADA | IPA | | |
| Synthesis Example 1 | 1 | 60 | — | 20 | 13 | — | 7 | 335 | 26 |
| Synthesis Example 2 | 2 | — | 60 | 20 | 15.5 | 4.5 | — | 320 | 40 |
| Synthesis Example 3 | 3 | — | 60 | 20 | 15.5 | 4.5 | — | 320 | 100 |
| Synthesis Example 4 | 4 | — | 50 | 25 | 17 | 8 | — | 312 | 35 |

<Preparation of Resin (B)>

As the resin (B) other than the liquid crystal polyester resin (A), the following resins were prepared.

Noncrystalline polyarylate: manufactured by Unitika Ltd., product name: U powder L type Polyethylene terephthalate (PET): product name (HOMOPET BK1) manufactured by Bell Polyester Products, Inc.

Polycarbonate: manufactured by Mitsubishi Engineering Plastics Co., Ltd., product name: Iupilon E-2000

Polyphenylene sulfide (PPS): manufactured by SOLVAY Co., Ltd., product name: Ryton QA200N Polyetheretherketone (PEEK): manufactured by SOLVAY Co., Ltd., product name: Keta Spire KT-850P <Manufacturing of Resin Composition>

Example 1-1

99 part by mass of the above-obtained liquid crystal polyester resin 1 and 1 part by mass of the above-described noncrystalline polyarylate were subjected to biaxial kneading using Laboplast Mill Micro Co., Ltd. (model number: 2D15W, manufactured by Toyo Seiki Seisakusyo Co., Ltd.) at a temperature of the melting point of DSC +30 to 40° C., and strands were cut to produce a pellet form resin composition. The obtained resin composition was confirmed to exhibit liquid crystallinity in the same manner as described above.

Comparative Example 1-1

A pellet-form resin composition was produced in the same manner as in Example 1-1 without kneading the liquid crystal polyester resin 1 obtained above with another resin (B). The obtained resin composition was confirmed to exhibit liquid crystallinity in the same manner as described above.

Example 2-1

99 part by mass of the above-obtained liquid crystal polyester resin 2 and 5 part by mass of the above-described noncrystalline polyarylate were subjected to biaxial kneading at a temperature of the melting point of DSC +30 to 40° C. using Laboplast Mill Micro (model number: 2D15W, manufactured by Toyo Seiki Seisakusyo Co., Ltd.) to obtain a pellet-from resin composition. It was confirmed that liquid crystallinity was exhibited in the same manner as described above.

Example 2-2

A pellet-form resin composition was produced in the same manner as in Example 2-1, except that 95 part by mass of the liquid crystal polyester resin 2 obtained above and 5 part by mass of the noncrystalline polyarylate were kneaded. It was confirmed that liquid crystallinity was exhibited in the same manner as described above.

Example 2-3

A pellet-form resin composition was produced in the same manner as in Example 2-1 except that 95 part by mass of the liquid crystal polyester resin 2 obtained above and 5 part by mass of the PET were kneaded. It was confirmed that liquid crystallinity was exhibited in the same manner as described above.

Example 2-4

A pellet-form resin composition was produced in the same manner as in Example 2-1 except that 99 part by mass of the liquid crystal polyester resin 2 obtained above and 1 part by mass of the polycarbonate were kneaded. It was confirmed that liquid crystallinity was exhibited in the same manner as described above.

Comparative Example 2-1

A pellet-form resin composition was produced in the same manner as in Example 2-1 except that the liquid crystal polyester resin 2 obtained above was not kneaded with the other resin (B). It was confirmed that liquid crystallinity was exhibited in the same manner as described above.

Comparative Example 2-2

A pellet-form resin composition was produced in the same manner as in Example 2-1 except that 99 part by mass of the liquid crystal polyester resin 2 obtained above and 1 part by mass of the PPS as above were kneaded. It was confirmed that liquid crystallinity was exhibited in the same manner as described above.

Comparative Example 2-3

A pellet-form resin composition was produced in the same manner as in Example 2-1 except that 99 part by mass of the liquid crystal polyester resin 2 obtained above and 1 part by mass of the PEEK above were kneaded. It was confirmed that liquid crystallinity was exhibited in the same manner as described above.

Example 3-1

95 part by mass of the above-obtained liquid crystal polyester resin 3 and 5 part by mass of the above-described noncrystalline polyarylate were subjected to biaxial kneading using Laboplast Micro (model number: 2D15W, manufactured by Toyo Seiki Seisakusyo Co., Ltd.) at a temperature of the melting point of DSC +30 to 40° C., and strands were cut to produce a pellet-form resin composition. It was confirmed that liquid crystallinity was exhibited in the same manner as described above.

Example 3-2

A pellet-form resin composition was produced in the same manner as in Example 3-1 except that 95 part by mass of the liquid crystal polyester resin 3 obtained above and 5 part by mass of the PET as above were kneaded. It was confirmed that liquid crystallinity was exhibited in the same manner as described above.

Comparative Example 3-1

A pellet-form resin composition was produced in the same manner as in Example 3-1 without kneading the liquid crystal polyester resin 3 obtained above with the other resin (B). It was confirmed that liquid crystallinity was exhibited in the same manner as described above.

Comparative Example 3-2

A pellet-form resin composition was produced in the same manner as in Example 3-1 except that 95 part by mass of the liquid crystal polyester resin 3 obtained above and 5 part by mass of the PEEK as above were kneaded. It was confirmed that liquid crystallinity was exhibited in the same manner as described above.

Example 4-1

95 part by mass of the liquid crystal polyester resin 4 obtained above and 5 part by mass of the above-described noncrystalline polyarylate were subjected to biaxial kneading using Laboplast Mill Micro Co., Ltd. (model number: 2D15W, manufactured by Toyo Seiki Seisakusyo Co., Ltd.) at a temperature of the melting point of DSC +30 to 40° C., and strands were cut to produce a pellet-form resin composition. It was confirmed that liquid crystallinity was exhibited in the same manner as described above.

Example 4-2

A pellet-form resin composition was produced in the same manner as in Example 4-1 except that 95 part by mass of the liquid crystal polyester resin 4 obtained above and 5 part by mass of the PET as above were kneaded. It was confirmed that liquid crystallinity was exhibited in the same manner as described above.

Comparative Example 4-1

A pellet-form resin composition was produced in the same manner as in Example 4-1 without kneading the liquid crystal polyester resin 4 obtained above with the other resin (B) It was confirmed that liquid crystallinity was exhibited in the same manner as described above.

The compositions of the resin compositions obtained above are shown in Table 2.

TABLE 2

| | Liquid Crystal Polyester Resin (A) | | Resin (B) | |
|---|---|---|---|---|
| | Type | Amount (w %) | Type | Amount (w %) |
| Example 1-1 | 1 | 99 | Noncrystalline Polyarylate | 1 |
| Comparative Example 1-1 | 1 | 100 | — | 0 |
| Example 2-1 | 2 | 99 | Noncrystalline Polyarylate | 1 |
| Example 2-2 | 2 | 95 | Noncrystalline Polyarylate | 5 |
| Example 2-3 | 2 | 95 | PET | 5 |
| Example 2-4 | 2 | 99 | Polycarbonate | 1 |
| Comparative Example 2-1 | 2 | 100 | — | 0 |
| Comparative Example 2-2 | 2 | 99 | PPS | 1 |
| Comparative Example 2-3 | 2 | 99 | PEEK | 1 |
| Example 3-1 | 3 | 95 | Noncrystalline Polyarylate | 5 |
| Example 3-2 | 3 | 95 | PET | 5 |
| Comparative Example 3-1 | 3 | 100 | — | 0 |
| Comparative Example 3-2 | 3 | 95 | PEEK | 5 |
| Example 4-1 | 4 | 95 | Noncrystalline Polyarylate | 5 |
| Example 4-2 | 4 | 95 | PET | 5 |
| Comparative Example 4-1 | 4 | 100 | — | 0 |

<Evaluation 1 of Resin Composition (X-ray Diffraction)>

The pellet-form resin compositions obtained in the above-described Examples and Comparative Examples were injection-molded at a temperature of the melting point+30° C. to prepare flat plate-shaped injection molded articles having 30 mm×30 mm×thickness 0.4 mm. The die in this injection molded article is a film gate, and the resin flows in one direction from one side of the flat plate-shaped die.

A diffraction pattern was obtained by transmitted X-ray using an X-ray diffractometer (model number: RINT2500, manufactured by Rigaku Co., Ltd.). In the measurement, a metal plate with holes was connected to an injection molded article, and X-ray was allowed to pass through only the centre portion of 16 mm (in the MD direction)×20 mm (in the TD direction) of the injection molded article, and this range was determined as the measurement position of the injection molded article, and the measurement range of 2θ was determined as 10-30°.

In order to evaluate the crystal orientation of the injection molded article, the direction of the same injection molded article was changed as described below, and measurement was performed twice to obtain an X-ray diffraction pattern.

Measurement 1: Resin flowing-in direction of the injection molded article (MD direction)

Measurement 2: Vertical direction thereto (TD Direction)

In this case, the diffraction of the maximum intensity at 2θ=19 to 20° (a peak indicating crystal diffraction derived from the intermolecular distance at the time of nematic liquid crystal in the liquid crystal polyester resin in the orthorhombic or hexagonal (110) plane diffraction of a random copolymer liquid crystal polyester) is a peak reflecting the distance between the main chains of the liquid crystal polyester, and it can be said that the higher diffraction intensity is, the stronger is the molecular orientation of the liquid crystal polyester observed in the crystal.

Figure 2:
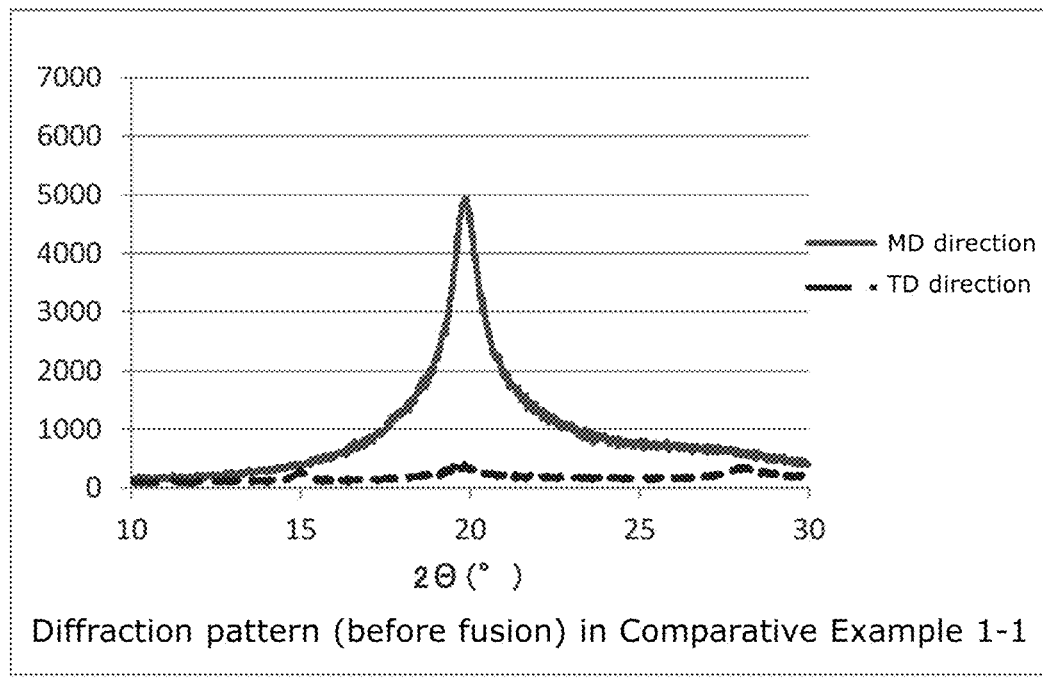
FIG. 2 shows an X-ray diffraction pattern of an injection molded article (before fusion) using a resin composition of Comparative Example 1-1.

X-ray diffraction patterns of injection molded articles (before fusion) using the resin compositions of Example 1-1 and Comparative Example 1-1 are shown in FIGS. 1 and 2, respectively.

Figure 3:
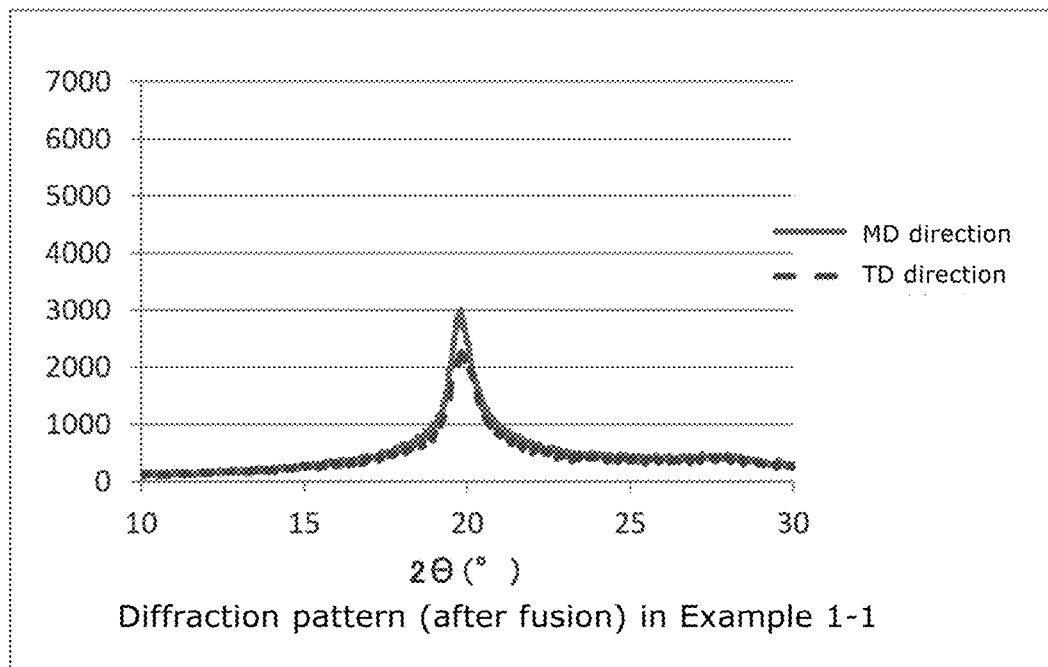
FIG. 3 shows an X-ray diffraction pattern of an injection molded article (after fusion) using a resin composition of Example 1-1.
Figure 4:
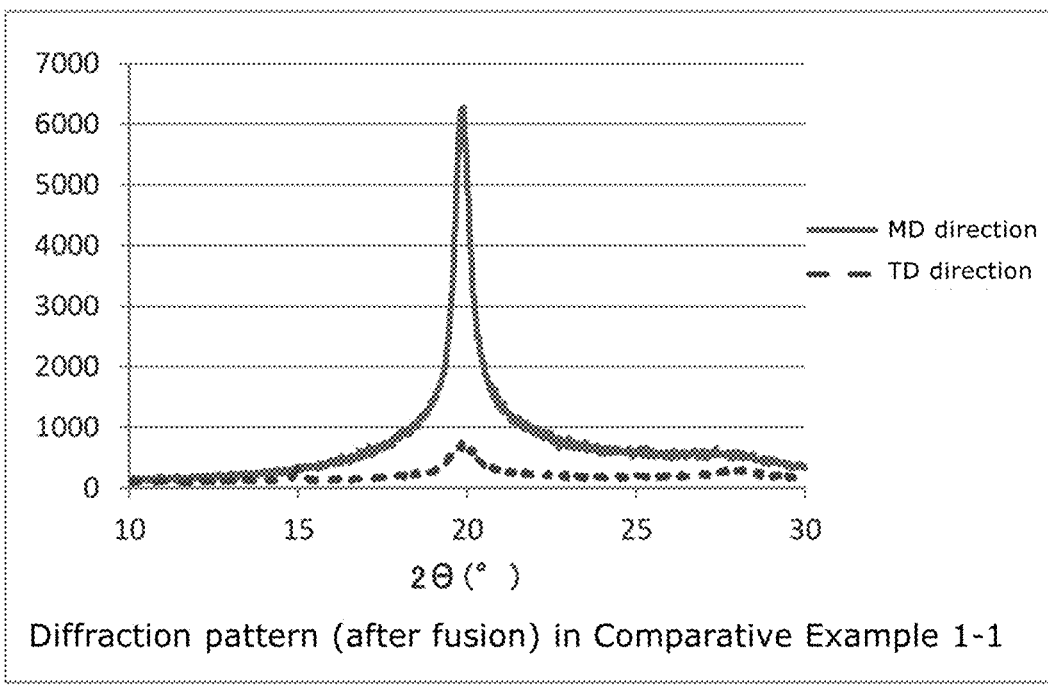
FIG. 4 shows an X-ray diffraction pattern of an Injection molded article (after fusion) using a resin composition of Comparative Example 1-1.

After the measurement, the injection molded articles were placed on a flat stainless steel tray and heated at a temperature of $Tm_2+20°$ C. or higher as evaluated by DSC under a nitrogen atmosphere for 1 hour using an inert oven DN411 (manufactured by Shibata Scientific Technology Co., Ltd.) so that the injection molded articles are fused. These were returned to room temperature, and X-ray diffraction patterns were obtained by the same transmitted X-ray measurement in the MD and TD directions as above in the injection molded articles once fused. X-ray diffraction patterns of injection molded articles (after fusion) using the resin compositions of Example 1-1 and Comparative Example 1-1 are shown in FIGS. 3 and 4, respectively.

The maximum diffraction intensity at 2θ=19° to 20° of the diffraction pattern before and after fusion in each of the Examples and the Comparative Examples is shown in Table 3. In addition, the ratio of the X-ray diffraction intensity in the MD direction to the X-ray diffraction intensity in the TD direction before and after fusion: I (TD)/{I (MD)+I (TD)} is also described.

TABLE 3

| | State (Heating temperature) | Maximum Diffraction Intensity | | 2θ (°) giving Maximum Diffraction Intensity | | Intensity Ratio I (TD)/ {I (MD) + I (TD)} | Isotropization |
|---|---|---|---|---|---|---|---|
| | | MD direction I (MD) | TD direction I (TD) | MD direction | TD direction | | |
| Example 1-1 | Before Fusion | 6763 | 482 | 19.78 | 19.82 | 0.07 | — |
| | After Fusion (355° C.) | 3005 | 2273 | 19.78 | 19.82 | 0.43 | ○ |
| Comparative Example 1-1 | Before Fusion | 4930 | 417 | 19.84 | 19.84 | 0.08 | — |
| | After Fusion (355° C.) | 6273 | 742 | 19.88 | 19.84 | 0.11 | x |
| Example 2-1 | Before Fusion | 7547 | 557 | 19.26 | 19.32 | 0.07 | — |
| | After Fusion (350° C.) | 2908 | 2908 | 19.34 | 19.34 | 0.50 | ○ |
| Example 2-2 | Before Fusion | 6150 | 533 | 19.34 | 19.2 | 0.08 | — |
| | After Fusion (350° C.) | 3087 | 2328 | 19.22 | 19.3 | 0.43 | ○ |
| Example 2-3 | Before Fusion | 6802 | 578 | 19.26 | 19.24 | 0.08 | — |
| | After Fusion (350° C.) | 2360 | 3643 | 19.46 | 19.42 | 0.61 | ○ |

TABLE 3-continued

| | State (Heating temperature) | Maximum Diffraction Intensity | | 2θ (°) giving Maximum Diffraction Intensity | | Intensity Ratio I (TD)/ {I (MD) + I (TD)} | Isotropization |
|---|---|---|---|---|---|---|---|
| | | MD direction I (MD) | TD direction I (TD) | MD direction | TD direction | | |
| Example 2-4 | Before Fusion | 6332 | 435 | 19.22 | 19.20 | 0.06 | — |
| | After Fusion (350° C.) | 2482 | 2037 | 19.28 | 19.40 | 0.45 | ○ |
| Comparative Example 2-1 | Before Fusion | 7382 | 623 | 19.26 | 19.28 | 0.08 | — |
| | After Fusion (350° C.) | 6317 | 1083 | 19.38 | 19.34 | 0.15 | x |
| Comparative Example 2-2 | Before Fusion | 5777 | 367 | 19.24 | 19.26 | 0.06 | — |
| | After Fusion (350° C.) | 4410 | 775 | 19.28 | 19.20 | 0.15 | x |
| Comparative Example 2-3 | Before Fusion | 6037 | 438 | 19.20 | 19.18 | 0.07 | — |
| | After Fusion (350° C.) | 8892 | 660 | 19.18 | 19.14 | 0.07 | x |
| Example 3-1 | Before Fusion | 4615 | 613 | 19.20 | 19.22 | 0.12 | — |
| | After Fusion (350° C.) | 2508 | 1447 | 19.22 | 19.28 | 0.37 | ○ |
| Example 3-2 | Before Fusion | 4995 | 570 | 19.22 | 19.20 | 0.10 | — |
| | After Fusion (350° C.) | 2360 | 1933 | 19.34 | 19.34 | 0.45 | ○ |
| Comparative Example 3-1 | Before Fusion | 7692 | 578 | 19.30 | 19.22 | 0.07 | — |
| | After Fusion (350° C.) | 5363 | 1407 | 19.34 | 19.34 | 0.21 | x |
| Comparative Example 3-2 | Before Fusion | 4758 | 525 | 19.22 | 19.22 | 0.10 | — |
| | After Fusion (350° C.) | 10355 | 703 | 19.20 | 19.22 | 0.06 | x |
| Example 4-1 | Before Fusion | 6330 | 562 | 19.38 | 19.38 | 0.08 | — |
| | After Fusion (340° C.) | 2537 | 4595 | 19.3 | 19.46 | 0.64 | ○ |
| Example 4-2 | Before Fusion | 7025 | 565 | 19.3 | 19.3 | 0.07 | — |
| | After Fusion (340° C.) | 2678 | 4483 | 19.36 | 19.38 | 0.63 | ○ |
| Comparative Example 4-1 | Before Fusion | 7023 | 587 | 19.34 | 19.24 | 0.08 | — |
| | After Fusion (340° C.) | 6337 | 1492 | 19.4 | 19.34 | 0.19 | x |

From the results shown in Table 3, the injection molded articles before being fused were seen with strong X-ray diffraction intensity only in the MD direction in both Examples and Comparative Examples, and a uniaxial orientation state was confirmed in which crystals derived from the liquid crystal structure were significantly oriented in the MD direction.

When these were fused, diffraction of 2θ=19 to 20° was observed in the MD or TD direction, which confirmed that the sample of the injection molded plate after fusion maintained the crystal structure derived from the liquid crystallinity. However, only the composition of the Examples showed a decrease in the X-ray diffraction intensity in the MD direction while showing a large increase in the diffraction intensity in the TD direction as compared before fusion. When the X-ray diffraction intensity ratio of MD and TD was confirmed, there was almost no diffraction in the TD direction before fusion, and the diffraction in the MD direction was extremely strong and dominant; however, the intensity ratio: I (TD)/{I (MD)+I (TD)} fell within the range of 0.30 to 0.70 after fusion, and the difference between I (MD) and I (TD) decreased significantly, which made it possible to understand that the uniaxial orientation observed in the crystal was relaxed and the structure became isotropic in domain units. As such characteristics can be seen from the Comparative Examples, it was confirmed that such characteristics cannot be obtained simply by kneading the liquid crystal polyester resin, but can be obtained only by kneading with a specific resin.

<Evaluation 2 of Resin Composition (Linear Expansion Coefficient)>

The injection molded articles obtained in the same manner as in <Evaluation 1 of Resin Composition> described above were fused at a temperature of $Tm_2+20°$ C. or higher. These were returned to room temperature, and the injection molded articles once fused were cut in the TD direction and the MD direction each to a width of about 4 mm to obtain strip-shaped samples for measurement. The linear expansion coefficient (CTE) of the samples for measurement was measured in a tensile mode using a thermo-mechanical analyzer (model number: TMA7000, manufactured by Hitachi High-Tech Science Co., Ltd.). Measurement was conducted for 2 cycles with the measurement interval of 15 mm and raising and lowering the temperature at 10° C./min in the temperature range from 30° C. to 230° C. CTE was measured in the temperature range of equal to or higher than the glass transition temperature of 170° C. to 230° C. at the second heating cycle. The measurement results are shown in Table 4.

TABLE 4

| | State (Heating temperature) | CTE (ppm/K) MD direcion | CTE (ppm/K) TD direction | CTE Difference: \|TD − MD\| (ppm/K) | Isotropization |
|---|---|---|---|---|---|
| Example 1-1 | Before Fusion | −25 | 155 | 180 | — |
| | After Fusion (355° C.) | 147 | 71 | 76 | ○ |
| Comparative Example 1-1 | Before Fusion | −29 | 232 | 261 | — |
| | After Fusion (355° C.) | 10.6 | 160 | 149 | x |
| Example 2-1 | Before Fusion | −36 | 144 | 180 | — |
| | After Fusion (350° C.) | 97 | 93 | 4 | ○ |
| Example 2-2 | Before Fusion | −41 | 153 | 194 | — |
| | After Fusion (350° C.) | 77 | 110 | 33 | ○ |
| Example 2-3 | Before Fusion | −38 | 156 | 193 | — |
| | After Fusion (350° C.) | 134 | 83 | 51 | ○ |
| Example 2-4 | Before Fusion | −38 | 134 | 172 | — |
| | After Fusion (350° C.) | 65 | 96 | 31 | ○ |
| Comparative Example 2-1 | Before Fusion | −44 | 146 | 189 | — |
| | After Fusion (350° C.) | −11 | 137 | 149 | x |
| Comparative Example 2-2 | Before Fusion | −29.3 | 138 | 167 | — |
| | After Fusion (350° C.) | 34 | 136 | 102 | x |
| Comparative Example 2-3 | Before Fusion | −31.5 | 152 | 184 | — |
| | After Fusion (350° C.) | −17 | 143 | 160 | x |
| Example 3-1 | Before Fusion | −30 | 125 | 155 | — |
| | After Fusion (350° C.) | 87 | 115 | 28 | ○ |
| Example 3-2 | Before Fusion | −23 | 139 | 162 | — |
| | After Fusion (350° C.) | 83 | 135 | 52 | ○ |
| Comparative Example 3-1 | Before Fusion | −33 | 153 | 187 | — |
| | After Fusion (350° C.) | 1 | 144 | 143 | x |
| Comparative Example 3-2 | Before Fusion | −25 | 133 | 158 | — |
| | After Fusion (350° C.) | 8 | 141 | 133 | x |
| Example 4-1 | Before Fusion | −33 | 144 | 177 | — |
| | After Fusion (340° C.) | 152 | 78.5 | 74 | ○ |
| Example 4-2 | Before Fusion | −31 | 143 | 174 | — |
| | After Fusion (340° C.) | 131 | 87 | 44 | ○ |
| Comparative Example 4-1 | Before Fusion | −37 | 232 | 269 | — |
| | After Fusion (340° C.) | 40 | 127 | 87 | x |

In general, a polymer material having molecular orientation has strong covalent bonds in the molecular orientation direction and aggregates by weak van der Waals force in the vertical direction to the molecular orientation direction, so that the CTE in the molecular orientation direction is small due to suppression of thermal expansion, and the CTE in the vertical direction with weak orientation becomes large. Particularly, it is known that a material having a significant uniaxial orientation is known to exhibit negative CTE in the molecular orientation direction. As shown in Table 4, both samples, regardless of the Examples and Comparative Examples, had CTE in the MD direction showing a significant uniaxial orientation with a negative value, which was obviously showing a smaller CTE in the TD direction in the state before fusion. Therefore, when the material in this state was heated in a range that the material does not fuse, the material contracts in the MD direction while expands greatly in the TD direction, resulting in significant anisotropy of physical properties. In the step of closely sealing with other general isotropic materials by heat, the degree of close sealing can be easily assumed to decrease because the thermal expansion behavior increases. By fusing the sample of the present invention, the negative CTE in the MD direction became positive and the shrinkage phenomenon due to heating was eliminated. The CTE difference (absolute value) between the TD direction and the MD direction was less than 80 ppm/K, and the anisotropy in physical properties was weakened, resulting in isotropic behavior. On the other hand, the sample of the Comparative Examples still had negative CTE in the MD direction depending on some cases, and the CTE difference (absolute value) between the TD direction and the MD direction was greatly different by 80 ppm/K or more both before and after fusion, and a significant anisotropic residual in physical properties was observed.

<Evaluation 3 of Resin Composition (Melt Tension)>

The melt tensile force, which is a polymer physical property in a molten state, was evaluated in order to apply the technology of stabilization of Isotropic state in domain units in a molten state found by the present inventors to mold processing.

The evaluation method is as follows.

Capillograph 1D, manufactured by Toyo Seiki Seisakusyo Co., Ltd. (a rheometer having a barrel inner diameter of 9.55 mm) and capillaries having an inner diameter of 1 mm were used to extrude the molten resin as a strand under the conditions of $Tm_2+20°$ C. of the liquid crystal polymer resin and a plunger extrusion speed of 82.3 mm/min (=extrusion speed at which the shear speed applied to the resin during passage through the capillaries becomes $1000\ s^{-1}$). The melt tension was measured when the extruded melt strand was wound and taken out with a wind-up roller set at a winding speed of 60 m/min through two pulleys. In the case of these determined extrusion speed and winding speed, the stretching magnification ratio of the liquid crystal polymer at the time of measurement was 8 times. This measurement was repeated three times for each sample and the average values are summarized in Table 5.

TABLE 5

|  | Melt Tension at 8 times of Stretching Magnification Ratio (mN) | Measurement Temperature (° C.) |
|---|---|---|
| Example 3-1 | 32 | 340 |
| Example 3-2 | 23 | 340 |
| Comparative Example 3-1 | 21 | 340 |
| Comparative Example 3-2 | 17 | 340 |

In forming a melt-extruded film, a polymer material is required to have a constant measurement of melt tension. Since an appropriate melt tension varies depending on the process to be worked, it is necessary to design the melt tension of the material according to the working method. Normally, the melt tension of a polymer has a strong correlation with the melt viscosity, that is, the average molecular weight; however, it is difficult in practical terms to increase the molecular weight of a polymer once produced. In the present invention, when the isotropic state at the time of fusion is stabilized by kneading the resin without additional polymerization and the resin is stretched and oriented, more energy is required than in the conventional liquid crystal polymer in which the orientation state is stable, and therefore, the melt tension increased.

The invention claimed is:

1. A resin composition comprising a liquid crystal polyester resin (A) comprising structural unit (I) derived from 6-hydroxy-2-naphthoic acid, structural unit (II) derived from a diol compound, and structural unit (III) derived from a dicarboxylic acid, and a resin (B) other than the liquid crystal polyester resin (A), and satisfying the following condition:

(condition)

a plate-form molded article obtained by flowing in the resin composition from one gate and subjecting to melt molding process is fused under no load without applying shear at a temperature equal to or 20° C. higher than Tm2 measured by DSC and subsequently re-cooled has an X-ray diffraction intensity measured by transmitted X-ray satisfying mathematical formula (1):

$$0.30 \leq (TD)/\{I(MD)+I(TD)\} \leq 0.70 \quad (1)$$

wherein

MD represents the flowing-in direction of the resin composition at the time of melt molding process and TD represents the vertical direction of MD;

I is the value of maximum diffraction intensity of X-ray diffraction data at the time of measuring the plate-form molded article with transmitted X-ray at 19-20°;

I (MD) is the value of diffraction intensity caused by molecular orientation of the MD direction; and I (TD) is the value of diffraction intensity of the TD direction, wherein the liquid crystal polyester resin (A) comprises 30 mol % or more of the structural unit (I) derived from 6-hydroxy-2-naphthoic acid based on total structural units of the liquid crystal polyester resin (A).

2. The resin composition according to claim 1, wherein the amount of the liquid crystal polyester resin (A) blended is 85 part by mass or more and 99.99 part by mass or less and the amount of the resin (B) blended is 0.01 part by mass or more and 15 part by mass or less, based on the total of 100 part by mass of the liquid crystal polyester resin (A) and the resin (B).

3. The resin composition according to claim 1, wherein the structural unit (II) derived from a diol compound is a structural unit derived from at least one selected from the group consisting of 4,4'-dihidroxybiphenyl, hydroquinone, methyl hydroquinone, and 4,4'-isopropylidene diphenol.

4. The resin composition according to claim 1, wherein the structural unit (III) derived from a dicarboxylic acid is a structural unit derived from at least one selected from the group consisting of terephthalic acid, isophthalic acid, and 2,6-naphthalene dicarboxylic acid.

5. The resin composition according to claim 1, wherein the resin (B) has at least one selected from the group consisting of an ester group, a carbonate group, and an ether group.

6. The resin composition according to claim 1, wherein the resin (B) is at least one selected from the group consisting of a noncrystalline polyarylate, polyester, and polycarbonate.

7. The resin composition according to claim 1, wherein the liquid crystal polyester resin (A) is synthesized from solid-phase polymerization.

8. A resin molded article comprising the resin composition according to claim 1.

9. An electric and electronic component comprising the resin molded article according to claim 8.

10. The resin composition according to claim 2, wherein the structural unit (II) derived from a diol compound is a structural unit derived from at least one selected from the group consisting of 4,4'-dihidroxybiphenyl, hydroquinone, methyl hydroquinone, and 4,4'-isopropylidene diphenol.

11. The resin composition according to claim 10, wherein the structural unit (III) derived from a dicarboxylic acid is a structural unit derived from at least one selected from the group consisting of terephthalic acid, isophthalic acid, and 2,6-naphthalene dicarboxylic acid.

12. The resin composition according to claim 11, wherein the resin (B) has at least one selected from the group consisting of an ester group, a carbonate group, and an ether group.

13. The resin composition according to claim 12, wherein the resin (B) is at least one selected from the group consisting of a noncrystalline polyarylate, polyester, and polycarbonate.

14. The resin composition according to claim 13, wherein the liquid crystal polyester resin (A) is synthesized from solid-phase polymerization.

15. A resin molded article comprising the resin composition according to claim 11.

16. An electric and electronic component comprising the resin molded article according to claim 15.

17. A resin molded article comprising the resin composition according to claim 12.

18. An electric and electronic component comprising the resin molded article according to claim 17.

* * * * *